United States Patent [19]

Johnson, Jr. et al.

[11] Patent Number: 4,848,460
[45] Date of Patent: Jul. 18, 1989

[54] CONTAINED RECOVERY OF OILY WASTE

[75] Inventors: Lyle A. Johnson, Jr.; Bruce C. Sudduth, both of Laramie, Wyo.

[73] Assignee: Western Research Institute, Laramie, Wyo.

[21] Appl. No.: 267,257

[22] Filed: Nov. 4, 1988

[51] Int. Cl.[4] .......... E21B 43/22; E21B 43/24; E21B 43/30; E21B 43/40

[52] U.S. Cl. .......... 166/245; 166/246; 166/266; 166/269; 166/272; 166/292; 210/611; 210/747; 210/901

[58] Field of Search .......... 166/245, 246, 272, 285, 166/292, 265, 266, 267, 303, 269; 210/610, 611, 747, 901, 170

[56] References Cited

U.S. PATENT DOCUMENTS

| 3,152,640 | 10/1964 | Marx | 166/245 |
|---|---|---|---|
| 3,186,484 | 6/1965 | Waterman | 166/272 X |
| 3,515,214 | 6/1970 | Finch | 166/272 |
| 4,302,051 | 11/1981 | Bass et al. | 166/265 X |
| 4,399,866 | 8/1983 | Dearth | 166/245 |
| 4,401,569 | 8/1983 | Jhaveri et al. | 166/246 X |
| 4,591,443 | 5/1986 | Brown et al. | 210/747 |
| 4,637,462 | 1/1987 | Grable | 166/245 |
| 4,660,639 | 4/1987 | Visser et al. | 166/267 |
| 4,730,672 | 3/1988 | Payne | 166/266 |
| 4,765,902 | 8/1988 | Ely et al. | 166/246 X |

Primary Examiner—George A. Suchfield
Attorney, Agent, or Firm—Browdy and Neimark

[57] ABSTRACT

A method is provided for recovering oily waste from oily waste accumulations underground comprising sweeping the oily waste accumulation with hot water to recover said oily waste, wherein said area treated is isolated from surrounding groundwater hydraulically. The hot water may be reinjected after the hot-water displacement or may be treated to conform to any discharge requirements.

11 Claims, 6 Drawing Sheets

CONTAINED RECOVERY OF OILY WASTE

FIELD OF THE INVENTION

The present invention relates to a process to remediate oily waste sites by recovering oily waste accumulations and immobilizing any residual organic liquids.

BACKGROUND OF THE INVENTION

Coal tars and pentachlorophenol solutions have contaminated a large number of industrial sites in the United States. Coal tars have been produced at over 1500 manufactured gas faciliates (cf. Anastos et al., Second Conference on Management of Municipal, Hazardous, and Coal Wastes Proceedings, Morgantown, W. Va., 1984; Unites and Housman, 5th Annual Madison Conference of Applied Research and Practice on Municipal and Industrial Waste Proceedings, University of Wisconsin, Madison, Wis., 1982; Krumrine, 1983 Technical Report 83-59T, Lafayette Hill, Pa.; Pereira et al., *Env. Tox. and Chem.* 2: 283-294, 1983; and U.S. EPA, "Survey of Town Gas and By-product Production and Locations in the U.S." (1880-1950), 1985) and at numerous coking plants for the steel industry (cf. Coates et al., *Mech. Eng.* 104 (2): 42-51, 1982). Creosote derived from coal tar and pentachlorophenol mixed with diesel oil have used as preservatives at over 1000 wood treating plants (cf. Hickok et al., ASCE Environmental Engineering Division Specialty Conference Proceedings, 1982). In many cases, these dense organic liquids have leaked from waste treatment faciliates or have been injected into disposal wells. About 40 wood treating sites are already included on the National Priorities List.

Discharges of dense oily liquids typically result in saturated subsurface accumulations of oily wastes (cf. Villaume, *Groundwater Monitoring Review*, Spring, 1985, 60-74). When they are denser than water, oily waste discharges permeate downwardly through the subsurface until further penetration is blocked by natural impermeable barriers such as bedrock or clay. Above these barriers, the organic liquid phase accumulates by filling a large fraction of the subsurface pore space. When the pore space becomes saturated with organic liquids, the oily waste accumulation spreads along the impermeable barriers. If this spreading accumulation encounters fractures, discontinuities or more permeable sections in the barriers, then the oily wastes penetrate into deeper strata.

Saturated subsurface accumulations of oily wastes are a persistent source of groundwater contamination. High organic liquid saturations reduce the relative permeability to water, so groundwater does not readily permeate oily waste accumulations. This natural resistance to groundwater permeation is expected to retard extraction of water-soluble compounds. Contaminants such as pentachlorophenol and polynuclear aromatic hydrocarbons have water solubilities less than 20-30 ppm (Goerlitz et al., *Environ. Sci. Technol.* 19(10): 955-961, 1985; Rao, editor, "Pentachlorophenol: Chemistry, Pharmacology, and Environmental Toxicology", Plenum Press, New York, 1978). At the expected high initial concentrations of these compounds, even an effective groundwater permeation would take decades to extract all of these contaminants.

High organic liquid saturations hinder natural microbial degradation of oily waste accumulations. Some of the organic liquid components are toxic to groundwater bacteria, and higher concentration of these compounds are expected when groundwater dilution is reduced by a low relative permeability to water. A low rate of groundwater permeation also reduces the supply of nutrients for microbial activity. These conditions are expected to limit the rate of either natural or induced microbial degradation and may even isolate large areas of oily waste accumulations as sterile environments.

Conventional groundwater treatments primarily address only lateral transport of soluble contaminants from oily waste accumulations. Pump-and-treat methods and slurry walls do not stop downward penetration of dense organic liquids and do not appreciably improve conditions for microbial degradation. Therefore, these conventional groundwater treatments require long-term maintenance and monitoring. During this long period, treatment requirements may increase if oily waste accumulations permeate downward and contaminate deeper aquifers.

Excavation can recover only shallow accumulations of oily wastes. In this case, organic liquids are removed to the depth of the excavation, but the excavation and subsequent treatment costs are high, and the exposure of contaminated materials can produce vapor emissions. Excavation is not practical for recovering deep accumulations of oily wastes, especially when the organic liquids have penetrated bedrock barriers.

Waterflood and steamflood technologies have been used extensively for petroleum and heavy oil production. Laboratory experiments have tested different operating parameters for waterflood (cf. Craig et al. "Oil Recovery Performance of Pattern Gas and Water Injection Operations from Model Tests," *Transacation of AIME*, 204: 7-15, 1955; Rapoport et al. *Transactions of AIME*, 213: 113-120, 1958), hot-waterflood (Dietz "Hot Water Drive", 7th World Petroleum Congress Proceedings, Mexico City, Mexico, April, 1967; El-Saleh and Farouq Ali, *Soc. Petr. Eng. Jour.*, 351-355, 1971), and steamflood processes (cf. Willman et al., *Transactions of AIME* 222: 681-690, 1961, Closmann et al., *Soc. Petr. Eng. Jour.* 417-426, 1983). Field applications of these processes have been reported by Bursell in *J. Petro. Tech.*, 1225-1231, October, 1970, and Konopnicki et al., in *J. Petro. Tech.* 546-552, May, 1979. Chemical additives have also been tested in previous waterflood and steamflood studies.

Zwicky, in U.S. Pat. No. 3,527,303, discloses a steam soak for recovering crude oil wherein a producing formation is first heated with steam and then produced. Caustic or detergents may be added to the steam to increase the affinity of the formation rock for water.

Clingman, in U.S. Pat. No. 4,057,106, discloses a method for injecting heated water into a partially depleted oil deposit to effect recovery of residual oil contained therein.

Parks et al., in U.S. Pat. No. 3,096,777, disclose that the adhesion of solid hydrocarbonaceous substances on walls of production equipment for oil deposits can be inhibited by contacting the wall with an aqueous dispersion comprising a hydrophilic water-dispersible colloid-producing polymeric substance such as alkali metal salts or lignosulfuric acid, glues, gum arabic, and the like.

Craig, Jr., in U.S. Pat. No. Re 25,918, discloses a method for recovering heavy oils from underground strata by steam extraction.

Bergman, in U.S. Pat. No. 2,470,132, discloses a well washing fluid comprising water soluble salts of carboxyalkylcellulose ethers along with saline material. This composition can be used to prevent swelling or plugging by bentonites or clays in the wells.

Bansbach, in Canadian Pat. No. 1,059,744, discloses a method for removing paraffin from surfaces to which they adhere. The method comprises subjecting the plugged surfaces to the action of a hot aqueous solution of a surfactant which can remove paraffin. The preferred compounds are nonionic surfactants, preferably oxyalkylates.

Russian Pat. No. 1,162,947 discloses that thioalcohols having from 2 to 6 carbon atoms, and alkyl alcohols having from one to 3 carbon atoms, can be used as surfactants for removing tar, asphaltene, and paraffin deposits.

SUMMARY OF THE INVENTION

It is an object of the present invention to provide a method for recovering organic liquids in oily waste accumulations.

It is another object of the present invention to displace the organic liquid phase in oily waste accumulations and displace the oily waste to production wells.

It is yet a further object of the present invention to immobilize any residual saturation of organic liquids.

It is still another object of the present invention to enhance conditions for microbial degradation of oily wastes.

According to the present invention, hot-water displacement is used to recover a major portion of the organic liquid phase in oily waste accumulations. The organic liquid phase is mobilized by controlled heating and is displaced to production wells by sweeping the oily waste accumulation with hot water. This recovery of oily waste accumulations immobilizes any residual saturation of organic liquids and greatly enhances conditions for microbial degradation. Chemical additives are incorporated into the recovery operation to extract contaminants that pose an immediate environmental concern or resist microbial degradation. During recovery operations, the mobilized liquids are contained vertically by controlling temperatures within the oily waste accumulation and horizontally by hydraulically isolating the affected area from the surrounding groundwater system. Excess water production is treated in compliance with discharge regulations currently in effect.

DETAILED DESCRIPTION OF THE INVENTION

According to the present invention, hot water is used to displace oily wastes from their ground-contaminating locations. Hot-water displacement of oily wastes depends on the mobility of water relative to the mobility of the organic liquid phase. This relative mobility is typically expressed as the mobility ratio of water to oil.

The mobility of each liquid phase is the ratio of relative permeability to viscosity, where the relative permeability indicates the ability of one fluid to flow relative to another, and the viscosity is a measure of internal resistance to flow.

An ideal mobility ratio is 1.0, and oil mobility decreases at higher mobility ratios. Conventional petroleum waterfloods have been operated at mobility ratios as high as 40 (Neil et al., "Waterflooding and Improved Waterflooding", Interstate Oil Compact Commission: Oklahoma City, Okla., Chapter 1, 1983). In petroleum reservoirs, waterflooding reduces the volume of oil in the pore space to residual saturation. At residual saturation, the remaining oil is immobile and is further recovered only by dissolution.

High saturations of the organic liquid phase increase oily waste mobility for hot-water displacement in the process. Organic liquid phase saturations of 35–60% of pore volume have been reported at one wood treating site. Using standard permeability correlations (Craft et al., "Applied Petroleum Reservoir Engineering", Prentice-Hall, Inc., Englewood Cliffs, N.J., 1959; Smith, "Mechanics of Secondary Oil Recovery", Reinhold Publishing Corp., New York, 1966) and the measured oily waste viscosity, the estimated mobility ratio of the oily waste is in the range of 2–130 at natural groundwater temperatures. This estimate indicates that the mobility of the more concentrated oily wastes is in the range of conventional technology for petroleum waterfloods.

Figure 1:
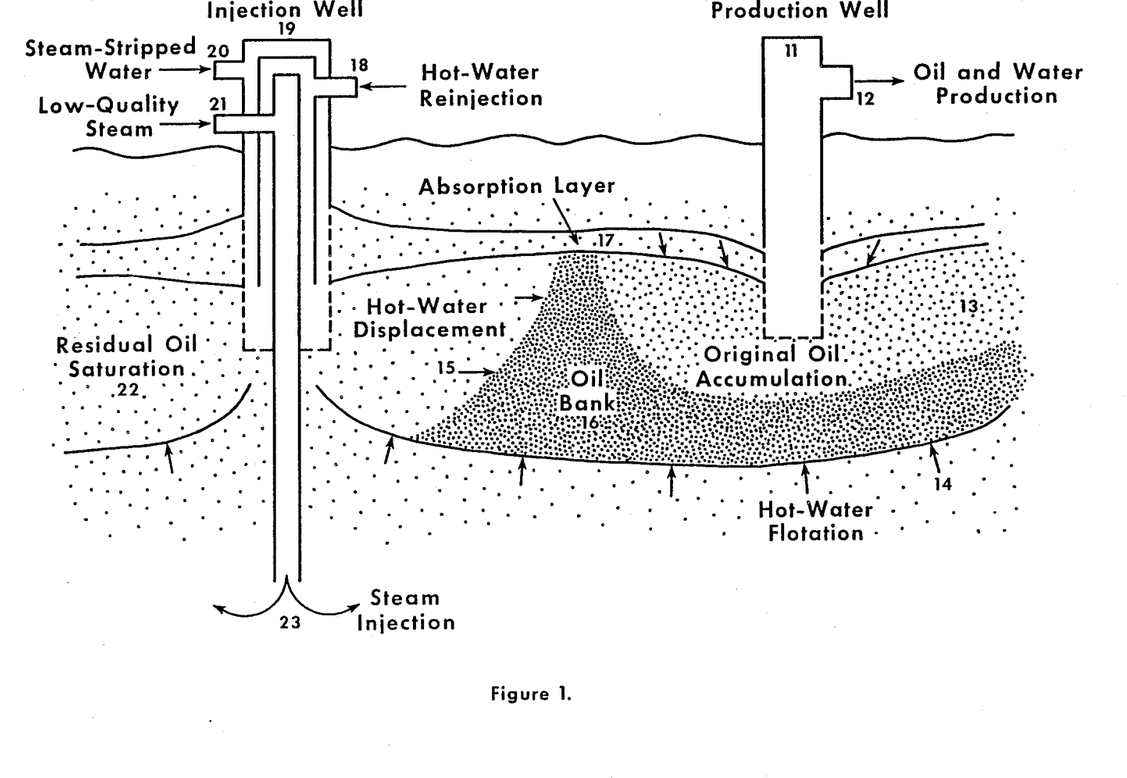
FIG. 1 shows a schematic of the process according to the present invention.

In FIG. 1, a production well is shown at 11, with oil and water being extracted from the original oil accumulation 13 at 12. Hot water is injected through injection well 19 at inlet 18; steam-stripped water is injected at 20, and low quality steam is injected at 21. The steam injection at 23 permeates the residual oil saturation 22 and oil bank 16, so that the hot water displaces the oil bank at 15. The absorption layer is shown at 17.

Figure 2:
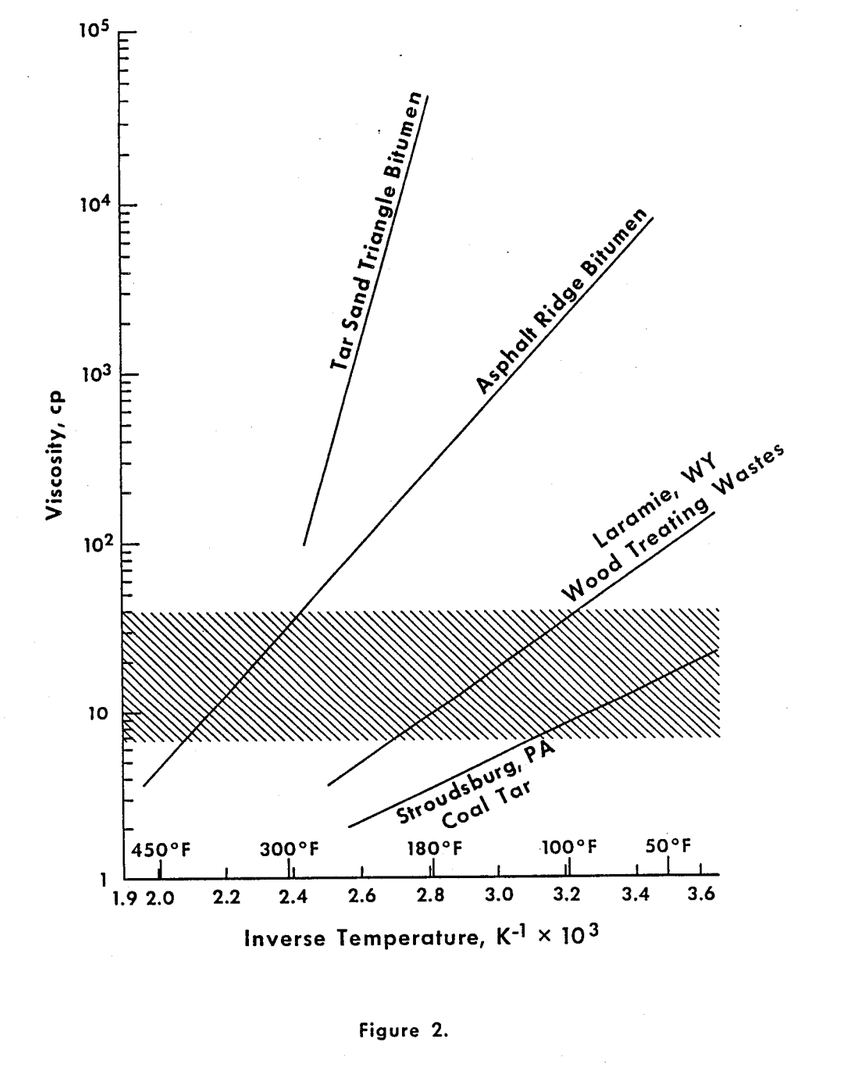
FIG. 2 shows the relationship between the viscosity of waste liquids and temperatures.

Oily waste mobility is improved significantly in the process according to the present invention by increasing the temperature to reduce the viscosity of the organic liquid phase. Using a standard correlation (Perry et al., "Perry's Chemical Engineer's Handbook", 4th Ed. Mc-Graw Hill Book Co., New York, 1963) to extrapolate reported viscosities (CH2M Hill, "Laramie, Wyoming Railroad Tie Treating Plant, Phase I, II, III, and IV Reports", Union Pacific Railroad, Omaha, Nebr., 1984; Villaume, op. cit.), the mobility ratio of water to oil is reduced to the range of 1–50 near the boiling point of water. At temperatures near the boiling point of water, the oily waste viscosity is about the same as the viscosity of tar sand bitumen at the saturated steam temperature. This equivalence of tar sand bitumen and oily waste viscosities at the corresponding temperatures for hot-water displacement is illustrated in FIG. 2.

Figure 3:
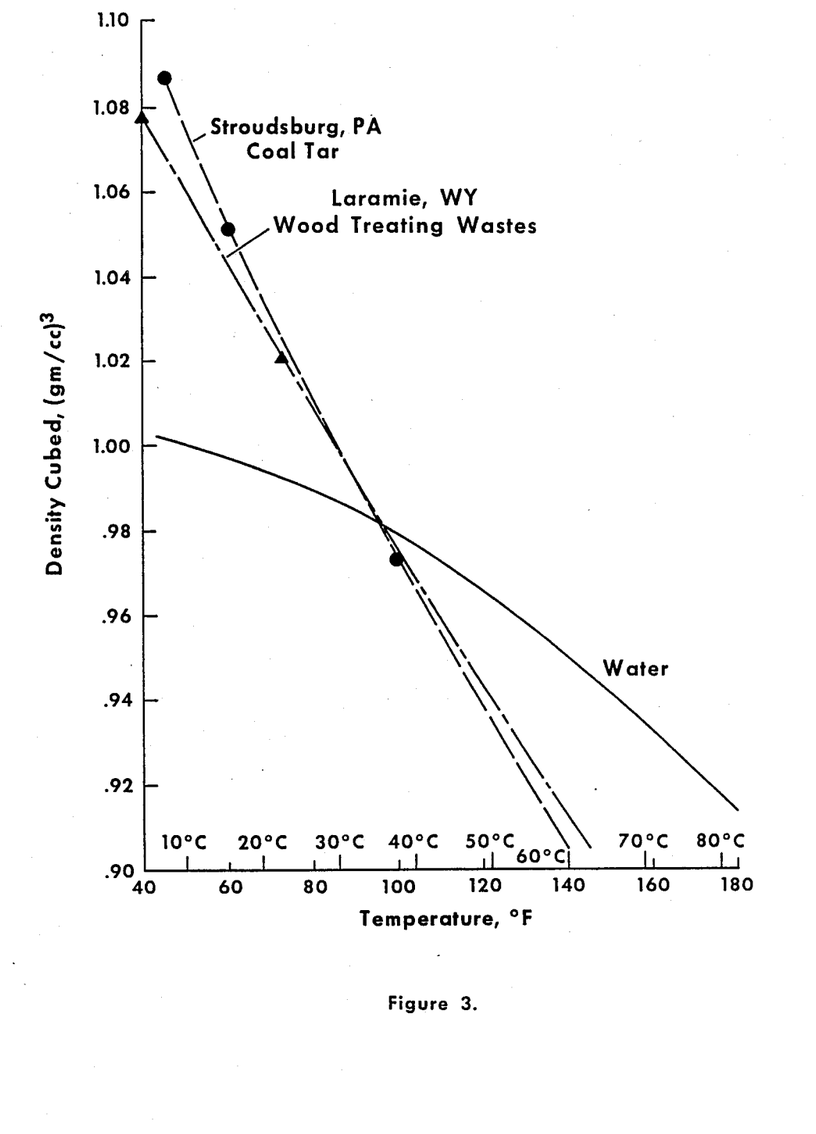
FIG. 3 shows the thermal expansion of liquid wastes with temperature.

Heating oily waste accumulations also reverses the density difference between the organic liquid phase and water. Based on published measurements of oily waste densities at both a manufactured gas site, as disclosed by Villaume and a wood treating plant (CH2M Hill op. cit.), the densities of the organic liquid phase and water are nearly equivalent at a temperature of about 100° F. At higher temperatures, the organic liquid phase has a lower density than water. The thermal expansion of oily wastes and water are compared in FIG. 3 using a standard relationship for extrapolating hydrocarbon densities (Perry et al. op. cit.). In the process according to the present invention, the downward penetration of dense organic liquids is reversed by the controlled heating of oily waste accumulations.

In the process of the present invention, low-quality steam and hot water are injected to control the heating and mobilization of oily wastes. The low-quality steam and hot water may be injected together as a mixture. The low-quality steam injection is controlled to heat groundwater below the deepest penetration of organic liquids. After the steam condenses, rising hot water dislodges and sweeps buoyant organic liquids upward into more permeable regions. hot water is injected above impermeable barriers to heat and mobilize the main accumulations of oily wastes. Heating the oily wastes reduces both the density and viscosity of the organic liquid phase to achieve the same oil mobilities that are typical of conventional petroleum waterfloods and tar sand steamfloods.

Mobility control polymers can further improve oily waste mobilization in the process according to the present invention. Commercial water-soluble polymers such as polyacrylamides or xanthan gum polysaccharides are commonly used to enhance petroleum recovery (Gogarty, J. Petr. Tech., 1089–1101, August, 1978). Although relatively uniform permeability distributions are expected at oily waste sites, the polymer additives can increase the water viscosity to reduce the mobility ratio for hot-water displacement. The polymer additives can also increase the water density to enhance the buoyancy of oily wastes.

In the process according to the present invention, mobilized oily wastes are recovered by hot-water displacement. After organic liquids are mobilized above impermeable barriers, hot-water injection and product recovery rates are controlled to sweep accumulated oily wastes through the more permeable regions. As in conventional petroleum waterfloods and tar sand steamfloods, displacement of oily wastes increases organic liquid saturations in the subsurface pore space to form an oil bank. Within the oil bank, high saturations of the organic liquid phase increase the relative permeability of oily wastes, so that injected hot water displaces the oil bank to production wells. Behind the oil bank, the oil saturation is reduced to an immobile residual saturation in the subsurface pore space.

Hot-water displacement of oily wastes closely resembles tar sand bitumen recovery using steamflood technology. In the steamflood process. condensation of injected steam heats the tar sand, and the bitumen is displaced by hot water in the steam front. As indicated in FIG. 2, the tar sand bitumen and oily waste viscosities are nearly the same at the corresponding temperatures of the processes.

Laboratory simulations of tar sand steamflood technology have nearly duplicated field test results. In the field test, the displacement process has reduced the bitumen saturation to 18.7% of the pore volume (PV). The corresponding, three-dimensional laboratory simulation has achieved a residual bitumen saturation of 16.5% PV. The one-dimensional laboratory tests have also indicated that the residual saturation depends only on the physical properties of the tar sand and not on the original saturation of the bitumen. The tar sand bitumen is always displaced to the same residual saturation, so oil recovery depends only on the original bitumen saturation in the pore space.

Creosote displacement by hot-water injection has also been demonstrated in a two-dimensional laboratory experiment. For this test, a commercial grade of creosate wood preservative was introduced into a bed of water-saturated silica sand. Hot-water injection recovered 70% of the creosote from the sand bed. This experiment demonstrated lateral displacement of creosote between injection and production wells at the same elevation in the sand bed and vertical displacement of creosote form permeable regions of the sand bed beneath the production well.

Micellar flooding additives have the ability to improve oily waste displacement in the process according to the present invention. In micellar flooding of petroleum, as reported by Gogarty, J. Petr. Tech., 1089–1101, August, 1978 and Meldau et al., J. Petr. Tech., 1279–1291, July, 1983, water-soluble surfactants reduce the surface tension between the aqueous and oil phases to form microemulsions. The surfactants also displace oil from solid surfaces by adsorption. This adsorption of surfactants on solid surfaces adversely affects the economics of petroleum recovery. However, enhanced displacement of oily wastes in comparison with other site remediation technologies may more than compensate for the cost of biodegradable surfactant losses.

Figure 4:
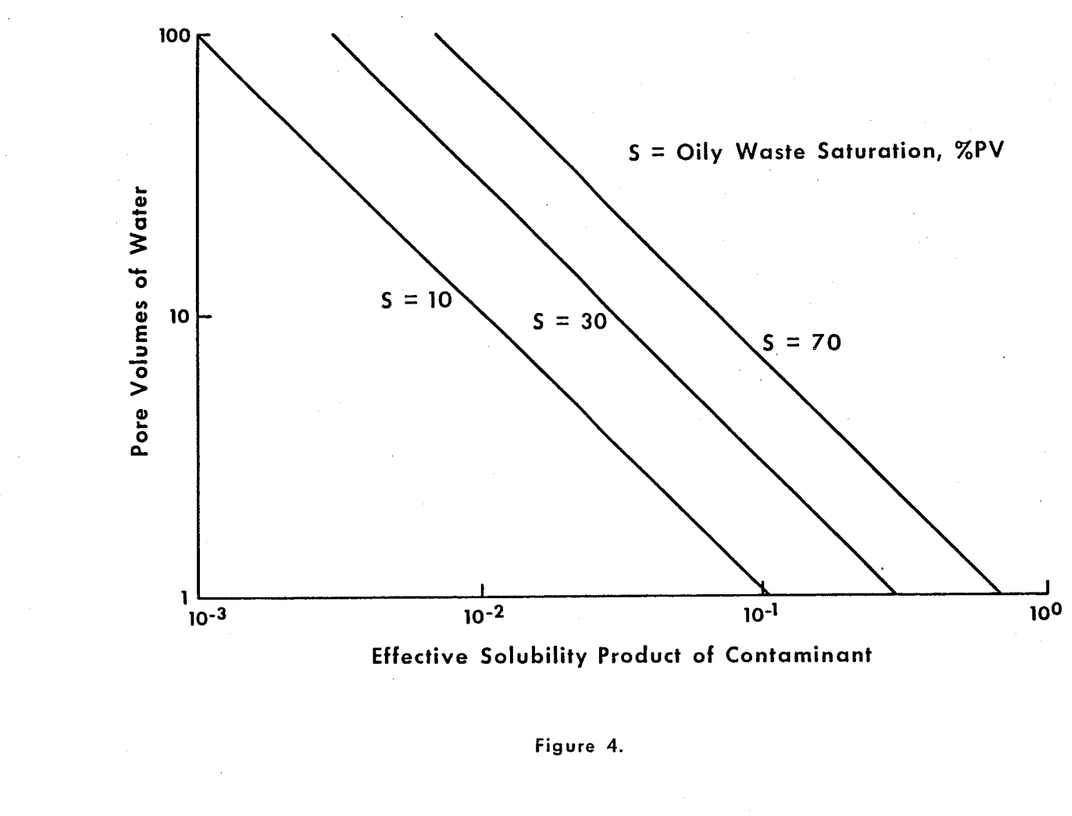
FIG. 4 shows the effective solubility product of contaminants.

In situ leaching of oily wastes depends on the saturation of the organic liquid phase, the concentrations of water-soluble contaminants, and the effective solubility of the contaminants. These relationships are illustrated in FIG. 4 by assuming that in situ leaching operates as an efficient countercurrent extraction and that the original contaminant concentration is constant for different oily waste saturations. Based on these assumptions, FIG. 4 indicates the pore volumes of water that are required for complete extraction of a contaminant from the organic liquid phase.

Natural groundwater permeation and conventional pump-and-treat methods are relatively ineffective for leaching water-soluble contaminants from oily waste accumulations. Most oily wastes are composed primarily of organic compounds with low water solubilities. At high organic liquid saturations, decades or groundwater permeation are required for complete extraction of these contaminants, even when the groundwater is assumed to permeate uniformly through the oily waste accumulation. If the low relative permeability to water at high organic liquid saturations precludes uniform groundwater permeation, then the pore volumes of water for complete extraction of contaminants are even greater than indicated in FIG. 4.

Organic liquid recovery in the process according to the present invention reduces the pore volumes of water for complete extraction of water-soluble contaminants. Hot-water displacement of the organic liquid phase recovers most of the highly water-soluble compounds and lowers the quantity of relatively insoluble groundwater contaminants. By recovering a portion of the organic liquids, the process also increases the relative permeability to water. Based on the tar sand processing trials, a uniform residual saturation is expected regardless of any variations in the original oily waste saturation. These more permeable and uniform conditions are ideally suited for controlling extraction of water-soluble compounds in the process according to the present inventions.

Chemical additives are used in the process according to the present invention to extract specific compounds that pose an immediate environmental concern or resist microbial degradation. FIG. 4 illustrates the potential enhancement of extraction efficiency when chemical additives increase the effective solubility product of specific compounds. By extracting specific compounds that are toxic to groundwater bacteria, the process of the present invention can also accelerate in situ biological treatment of residual oily wastes.

The process of the present invention contains oily wastes vertically by controlling temperatures during the hot-water displacement. Low-quality steam injection beneath oily waste accumulations heats the organic liquid phase, which thermally expands to a density that is less than the surrounding hot water. Flotation of the heated organic liquid phase is limited by injecting cooler water above the oily waste accumulations. In this cooler water, the organic liquid phase contracts and becomes more dense than the surrounding water. Cooler water temperatures above the oily waste accumulation are maintained by operating the displacement process in the laminar flow regime and by natural conductive heat losses to the ground surface.

Stratified laminar flow of cool water on top of hot water has been demonstrated using a two-dimensional bed of water-saturated silica sand. For this demonstration, cool water dyed blue was injected above a flow of warm water dyed yellow. A single production well at the same elevation as the warm water injection was pumped at a rate equal to the combined injection of both warm and cool water. At these conditions, the two laminar flows remain stratified, and no green coloration from mixing of the dyes is evident. When water dyed red is injected in place of either previous water color, the red water completely displaces the former water color. There results indicate that no water remains stagnant on either side of the boundary between the stratified laminar flows.

Cooler water injection above oily waste accumulations also controls vapor emissions from the process according to the present invention. Lower water temperatures reduce the vapor pressure of volatile components near the ground surface. This cooler water can also serve as an absorber for volatile compounds during the hot-water displacement. In this case, both the temperature and concentration of soluble, volatile compounds are controlled to avoid vapor emissions at the ground surface.

Recovering oily wastes to residual saturation immobilizes any remaining organic liquid phase. At residual saturation, the organic liquid phase remains immobilized within the subsurface pore space and does not move during injection operations for chemical solution treatment or induced microbial degradation. During oily waste displacement in the process according to the present invention, only lateral containment of the site is required to isolate any residual organic liquid saturation from the surrounding groundwater system.

Oily wastes and soluble contaminants are contained laterally by groundwater isolation. In the process according to the present invention, a pattern of injection and production wells is used to sweep the entire oily waste accumulation and to recover both the organic liquid and aqueous phases. Based on specific hydraulic measurements at a site, the well pattern and pumping rates are designed to contain all of the mobilized liquid phases within site boundaries. This design can also incorporate a physical groundwater barrier such as a slurry wall to assist lateral containment of a site.

Figure 5:
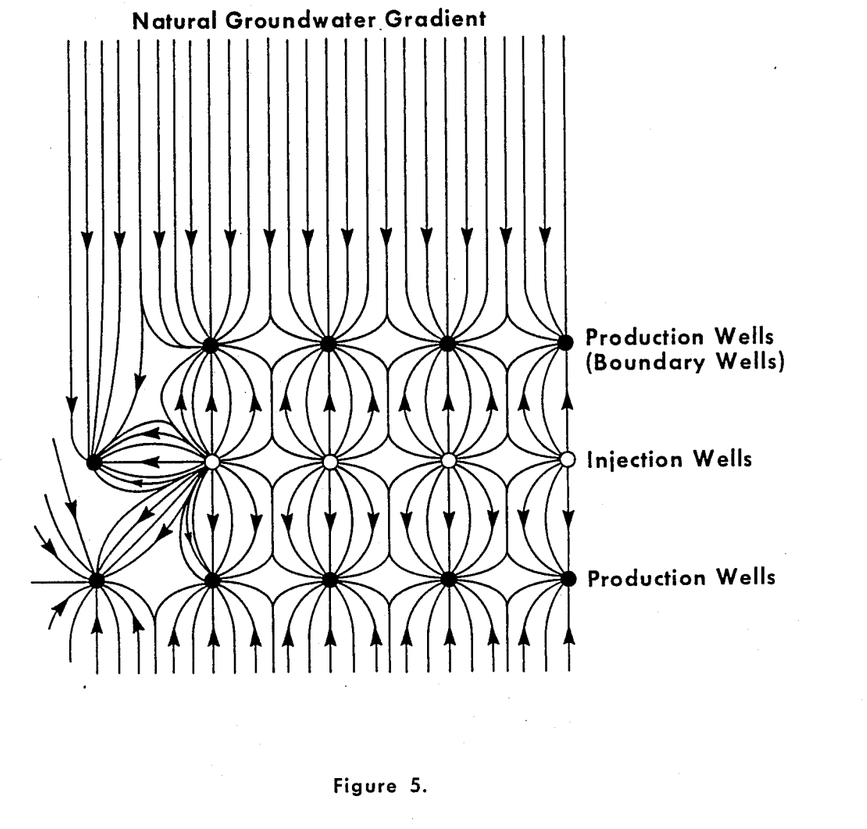
FIG. 5 shows a groundwater isolation barrier.

FIG. 5 shows one embodiments of a groundwater isolation barrier for a specific set of hydraulic site characteristics. In this example, the process of the present invention is operated with production wells surrounding the oily waste accumulation. The production operations are designed to recover all of the mobilized liquid phases by depressing the potentiometric surface elevation around the site. Alternatively, a surrounding ring of injection wells may isolate some process applications more effectively by maintaining a freshwater buffer around the site. The design of a groundwater isolation barrier always depends on a thorough characterization of the geohydrologic environment at any specific site.

Figure 6:
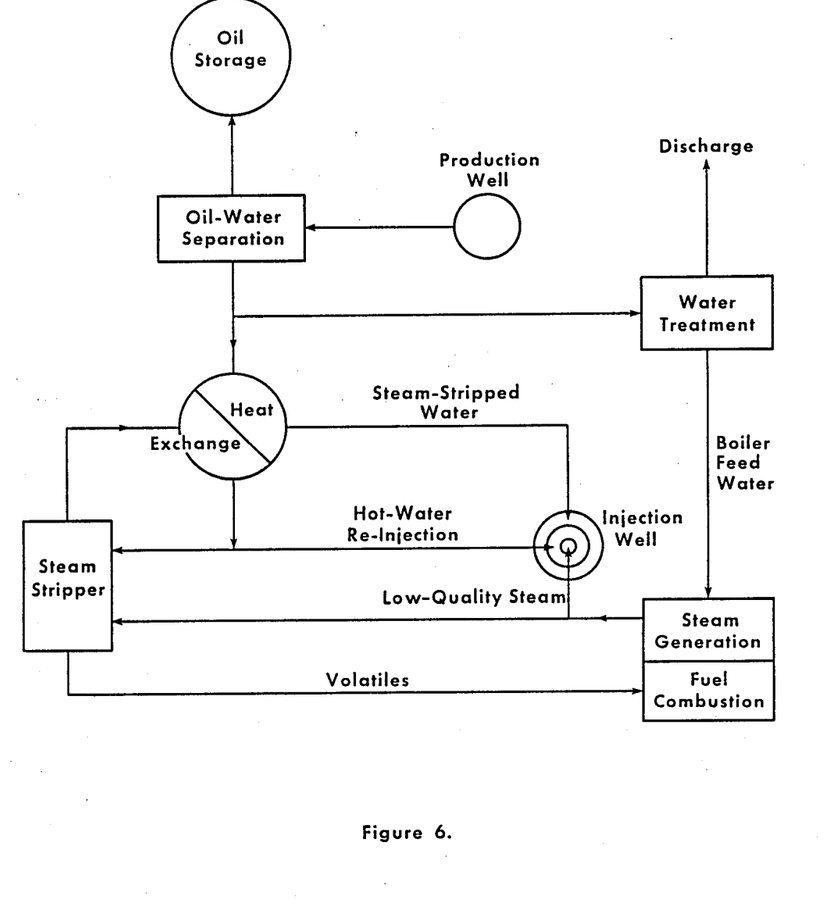
FIG. 6 shows a proposed surface facilities for use in the process according to the present invention.

The process according to the present invention minimizes wastewater treatment if the hot-water displacement is operated by re-injecting recovered process water. In this simplest case, illustrated in FIG. 6, only the boiler feed and discharge water are treated after separating the product oil and water phases. This wastewater treatment corresponds only to the steam injection and groundwater influx rates. Injection of cooler water to control volatile emissions may also require hot-gas or steam stripping. All of the recovered water is treated when the process of the present invention is operated to remove soluble contaminants from the oily waste.

Suspended oils and solids are removed from the wastewater before other treatment steps. In conventional heavy oil production, suspended oils and solids are removed by gravity separation, chemical flocculation, gas flotation, mechanical filtration, or a combination of these methods. In synfuels process research, it was found that chemical additives have successfully enhanced the gravity separation of oil and water emulsions (Robertson, *Liquid Fuels Technology*, 1(4), 325–333, 1983), and coagulation-flocculation has removed suspended oils and solids from tar sand process waters. Coagulation-precipitation with cationic polymers has removed solids and acetone-soluble tar from condensates, and solvent sublation has simultaneously removed both suspended solids and dissolved phenols from condensates (Nolan et al., "Physical-Chemical Treatment of UCG Wastewater by Solvent Sublation", 11th Underground Coal Gasification Symposium Proceedings, Morganstown, W. Va., 1985).

Biological oxidation most economically reduces high levels of dissolved organic compounds in a variety of wastewaters from synfuel production processes. Process waters from tar sand recovery have been treated successfully in two separate studies (Torpy et al., Argonne National Laboratory Report Number ANL/ES-115, 1981; Klock, "Biological Treatment of Tar Sands Wastewater", DOE Report DE-AC20-83LC11003, 1985). Recent tests have also demonstrated the breakdown of phenols in wastewaters (Adams et al., "Phenol Degradation by Indigenous Bacteria in Underground Coal Gasification Wastewaters, Laramie, Wyo., 1986).

Combinations of physical-chemical treatments have also been developed to meet current water discharge requirements. For chemically complex wastewaters from oil shale retorting, dissolved volatiles, organics, and solids are removed by the treatment sequence of steam stripping, carbon adsorption, and reverse osmosis. Groundwater affected by the process operations has also been treated using nearly the same process sequence with the addition of coagulation-precipitation to remove selected metals and calcium hardness (Nolan et al., "Summary Report on Physical-Chemical Treatment of UCG Wastewater", Laramie, Wyo., 1986).

Remediation of oily waste sites is completed using in situ biological treatment in the process according to the present invention. During this final remediation, the injection and production wells are used to induce and monitor microbial activity. The process operations are complete when groundwater contaminants are no longer detected in any water samples from the site.

Recovering a major portion of the oily waste accumulation reduces in situ biological treatment requirements. In addition to reducing the quantity of oily wastes by hot-water displacement, chemical extraction of the residual organic liquids can reduce concentrations of oily wastes by hot-water displacement, chemical extraction of the residual organic liquids can also reduce concentrations of specific compounds that are toxic to groundwater bacteria or resist microbial degradation. Also, the process according to the present invention immobilizes any residual organic liquids to prevent deeper groundwater contamination. In some cases, these preliminary treatments may adequately facilitate further site remediation strictly by natural microbial activity.

The process of the present invention also enhances conditions for inducing microbial activity to accelerate complete remediation of oily waste sites. Reducing oily waste accumulations to the residual saturation of the organic liquid phase increases the relative permeability to water and the uniformity of the permeability distribution. At these more uniform and permeable conditions, bacteria inoculation, nutrient addition, environmental manipulation, and byproduct removal are controlled more effectively to accelerate complete remediation.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A method for recovering oily waste from oily waste accumulations underground comprising:
   hydraulically isolating an area of oily waste accumulation from ground water by a method selected frm the group consisting of providing production wells around said area, providing a ring of injection wells around said area, and providing a physical ground water barrier; and
   sweeping said oily accumulation with hot water to recover said oily waste.

2. The method of claim 1 wherein said hot water comprises a mixture of low quality steam and hot water.

3. The method according to claim 1 wherein a mobility control additive is added to the hot water.

4. The method according to claim 1 wherein a surfactant is added to the hot water.

5. The method according to claim 1 wherein the oily waste comprises coal derived liquids.

6. The method according to claim 1 wherein the oily waste comprises petroleum based liquids.

7. The method of claim 1 wherein production wells surround and penetrate the oily waste accumulation.

8. The method according to claim 1 wherein injection wells surround the oily waste accumulation.

9. The method according to claim 1 wherein water recovered from the oily waste is treated to remove volatiles from the water recovered.

10. The method according to claim 9 wherein the treated water is recycled.

11. The method of claim 1 wherein the area is inoculated with microorganisms that remove residual oily waste.

* * * * *